Dec. 11, 1962 J. D. VAN GEEM ETAL 3,067,901
FIBERGLASS MILK BOTTLE CRATE
Filed Aug. 5, 1959
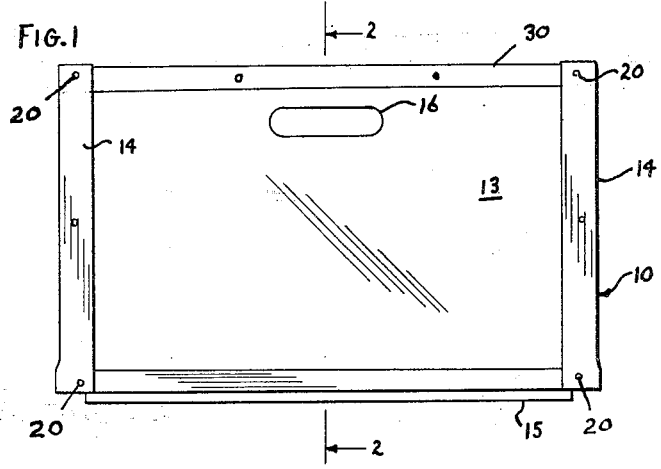
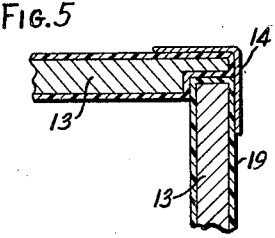
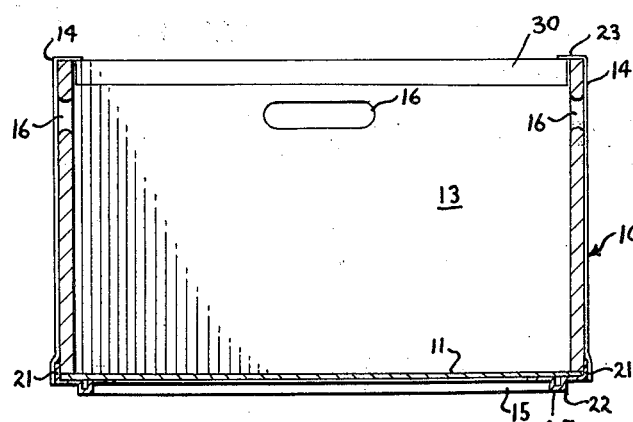
INVENTORS
JOHN DELMAR VAN GEEM
ROY H. NORDIN
BY
ATTORNEY

United States Patent Office 3,067,901
Patented Dec. 11, 1962

3,067,901
FIBERGLASS MILK BOTTLE CRATE
John Delmar Van Geem, 3931 Parkside Ave., and Roy H. Nordin, 1546 W. 32nd St., both of Erie, Pa.
Filed Aug. 5, 1959, Ser. No. 831,872
2 Claims. (Cl. 217—65)

This invention relates to containers or carrying cases and, more particularly, to crates and carrying cases for carrying milk bottles and cartons.

Crates for carrying milk bottles for domestic delivery are commonly made of wooden material reinforced with metal at the corners. This wooden material is usually unpainted and, in order to maintain smooth surfaces thereon, the maintenance must be constantly continued. Scratches on the wooden surface due to contact of the crate with hard sharp objects during rough handling mar the surface and cause a source of unsanitary material and, as a result, it is difficult to maintain the crates in a sanitary condition. The wood in the crates is subjected to scratching and abrasion as aforesaid and, therefore, the life of the ordinary wooden milk crate is not long.

Further, it is difficult to maintain a wooden milk crate with a neat and pleasant appearance. The wooden material is not as strong as desirable to withstand the stresses and strains to which it is subjected in handling and transportation.

Wire crates have also been used extensively. The wire used in these crates bends and kinks and the kinks dig the milk bottles. Wire crates do not work well on the automatic machines.

Molded plastic has been used to some extent for milk bottle crates. Molded plastic crates are inclined to break when subjected to rough use. It is expensive to repair these molded plastic crates. Often, it is not even economical to repair them. These wire crates and molded plastic crates cannot be shipped disassembled but must be shipped fully assembled. This causes grater expense in shipment as well as inconvenience in handling and storage prior to ultimate use.

The milk crate disclosed herein is made of improved panels consisting of wooden material which is completely enclosed in a fiberglass material. The panels are held together by a riveted steel structure. This fiberglass material prevents liquids from penetrating the wood, is strong and resistant to abrasions and damage, is also easily cleaned and, therefore, is maintained in a sanitary condition.

The material is colorful, has a non-porous, non-corrosive surface which stays cleaner and retains a more pleasing appearance. Repair and assembly are greatly simplified over the welded wire crates or fully molded plastic crates. The smooth one piece plastic panels disclosed herein provide a far more protective surface as well as improved temperature insulation for the cartons and milk. The core of the reinforced panels disclosed herein is completely encompassed at the edges and rivet holes so that the water from washing, icing, and condensation will not penetrate the core, thereby increasing weight, separation, decay, or general deterioration of the core. Further, the glass reinforced plastic surface of the panels disclosed is ridged or recessed for protection of the edges of the steel reinforcements and name marking. This improves the general appearance of the crate.

It is, accordingly, an object of the present invention to utilize the improved properties of reinforced plastic in a manner which minimizes the quantity used without sacrificing durability, thereby providing a crate possessing these improved properties which may be manufactured at a competitive cost.

Another object of the invention is to provide a sturdy case which will have a long service life to protect bottles on today's handling equipment.

Still another object of the invention is to provide a strong, durable, sanitary, and neat appearing milk crate.

Yet another object of the invention is to provide a milk crate made of fiberglass coated material.

A further object of this invention is to provide an improved milk crate.

A still further object of the invention is to provide a milk crate which is simple in construction, economical to manufacture, and simple and easy to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a side view of the container according to the invention;

FIG. 2 is a cross sectional view taken on line 2—2 of FIG. 1;

FIG. 3 is a top view of the container shown in FIG. 1 with two of the corners cut away;

FIG. 4 is a cross sectional view of one of the four sides of the container; and

FIG. 5 is a partial enlarged view of one corner of FIG. 3.

Now with more specific reference to the drawing, FIG. 1 shows a container 10 which is suitable for transporting quart milk bottles. The container 10 has four sides 13 made of wood encased in fiberglass and held together by steel angles. The container 10 also has a steel bottom 11 and an open top.

Elongated slots 16 are formed in the upper section of the four sides 13. The slots 16 are rounded off and form hand grips as shown in FIGS. 1, 2, and 4. The sides or panels 13 are made of wood as indicated at 18 encased in a layer of fiberglass 19 on each side of the wood and completely surrounding it. The fiberglass completely encases the surface of each sheet between the joints. One edge of each sheet is mitered and this mitered part of each sheet is completely encased in the fiberglass. The wood may be ordinary plywood or it could be some low grade lumber since the fiberglass takes most of the stress applied to the panel when in use. The wood most suitable for use in a milk bottle crate is about five-sixteenths inch thick plywood.

The term "fiberglass" as used herein includes both glass fibers and resin. The glass fiber will preferably be embedded in a polyester resin approximately .021 inch thick.

The bottom 11 is shown as being made of sheet steel or other suitable material. Drain holes 12 are formed therein as shown in FIG. 3. Bottom support angles 15 support the bottom 11 to the sides 13. Each angle 15 has its vertical leg 21 lying along the lower part of the side panels 13 and its horizontal leg 22 underlying the bottom 11. The bottom 11 is welded to the horizontal leg 22. A channel 25 formed in the horizontal leg 22 provides a foot or support to hold the container 10 in spaced relation to a supporting surface. The channel 25 is formed in the horizontal leg 22 intermediate the inner and the outer edges thereof.

An angular corner iron 14 is attached to each corner of the container 10 to hold the side panels 13 together. One leg of each corner iron 14 is attached to a side panel 13 at a corner 17 with rivets 20 or other suitable fastening means. The upper sections of the corner irons 14 are bent inwardly to form a flange 23 which extends over and caps the upper corners of the side panels 13. The upper edges of the side panels 13 may be reinforced by channel shaped top irons 30 which overlie the upper edges of the panels 13 and are attached by rivets or other suitable fastening means.

The lower ends of the corner irons 14 overlie the vertical leg 21 of the angle 15. The bottom rivet 20 passes through the side panel 13, the leg 21, and the iron 14.

The crate disclosed may be shipped and stored unassembled prior to use. It may be shipped abroad in this condition at a saving. The assembly work can thus be done at the most favorable location. The panels attached by the corner iron construction make it practical to repair or rebuild a damaged crate by replacing the damaged part. The fiberglass encased panels are resistant to damage and have the other advantages enumerated herein.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows.

I claim:

1. A milk bottle crate having four side panels, a bottom, and an open top, each said side panel comprising a sheet of wood encased in a polyester resin with fiberglass impregnated therein completely encasing said wood sheet, one edge of said wood sheet being mitered and said polyester resin encasing said mitered edge, said edge of each said side panel being mitered to approximately half its thickness, said mitered edge of each said side panel receiving an unmitered edge of an adjacent side panel forming joints, said polyester resin completely encasing the surface of each said sheet between said joints, an angular shaped corner member on each corner of said container with one leg of each said angular member overlying a part of said side panel, and an upwardly extending leg on an angle member attached to said bottom and being fixed to said side panels and to said corner members.

2. A milk bottle crate having four side panels, a bottom, and an open top, each said side panel being made of a sheet of wood encased in a polyester resin with fiberglass impregnated therein, hand receiving holes in each said panel, said polyester resin completely covering said wood around the margin of said hand receiving holes, one edge of each said side panel being mitered to approximately half its thickness, said mitered edge of each said side panel receiving an unmitered edge of an adjacent side panel forming joints, said polyester resin completely encasing the surface of each said sheet between said joints, an angular shaped corner member on each corner of said container with one leg of each said angular member overlying a part of said side panel, and an upwardly extending leg on an angle member attached to said bottom and being fixed to said side panels and to said corner members.

References Cited in the file of this patent

UNITED STATES PATENTS

| 1,501,351 | Lyndon | July 15, 1924 |
| 1,997,335 | Krzyzak | Apr. 9, 1935 |
| 2,417,586 | Crosley | Mar. 18, 1947 |
| 2,695,178 | Rheinfrank | Nov. 23, 1954 |
| 2,774,044 | Toulmin | May 1, 1956 |
| 2,850,204 | Rehrig | Sept. 2, 1958 |

FOREIGN PATENTS

| 17,676 | Great Britain | 1908 |
| 45,017 | Sweden | Feb. 5, 1919 |